H. HOLDEN, R. G. BROOKE & T. H. WHITE.
INJECTOR.
No. 10,811. Reissued Mar. 1, 1887.
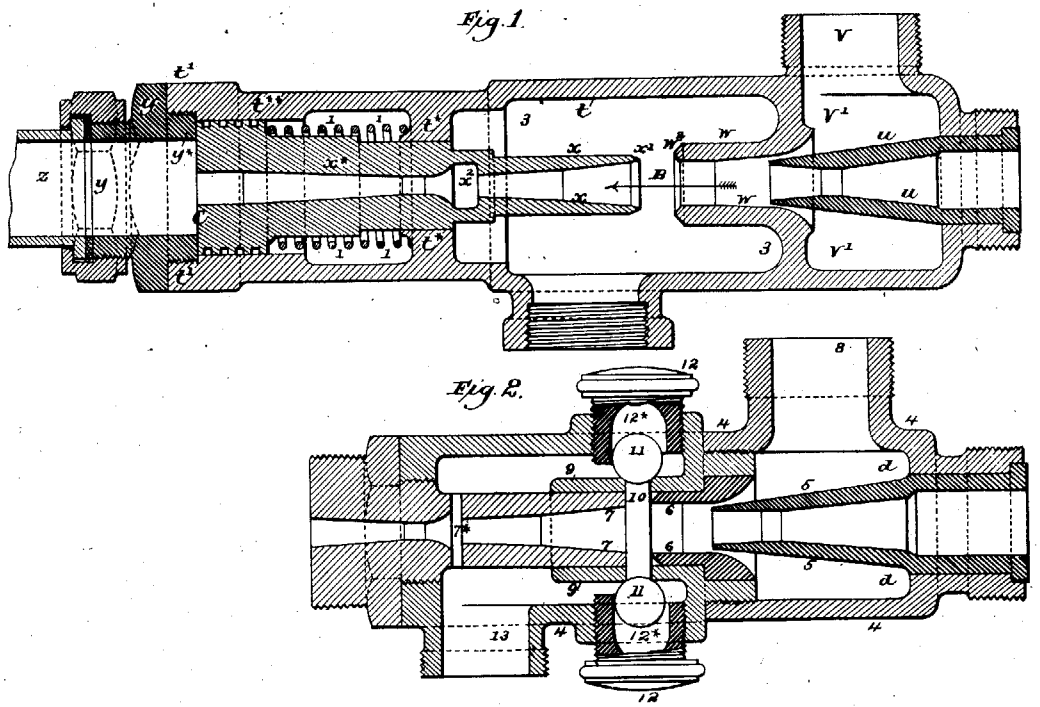
Witnesses:
Geo. H. Bott.
Edwd Herter.
Inventors:
Harry Holden
Robt Grundy Brooke
Thos Henry White
by their Attys
Brown & Page

H. HOLDEN, R. G. BROOKE & T. H. WHITE.
INJECTOR.
No. 10,811. Reissued Mar. 1, 1887.
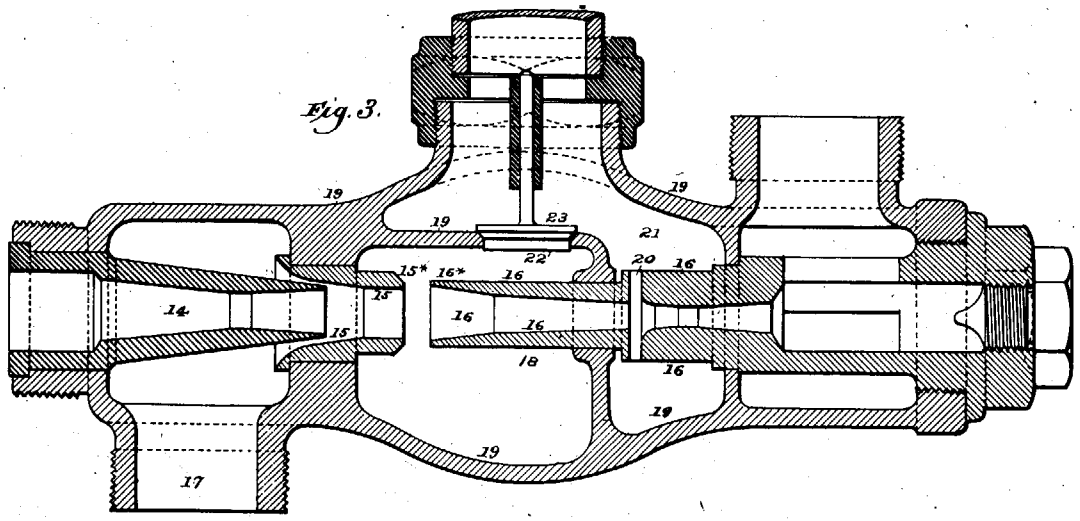
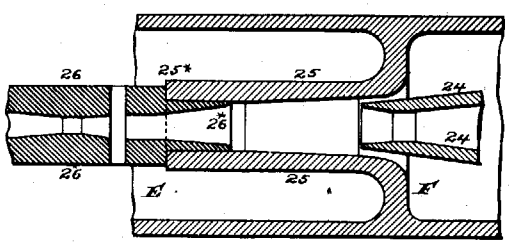
Witnesses:
Geo. H. Botts.
Emil Herter.
Inventors:
Harry Holden
Robt. Grundy Brooke
Thos. Henry White
by their attys
Brown & Hall

H. HOLDEN, R. G. BROOKE & T. H. WHITE.
INJECTOR.
No. 10,811. Reissued Mar. 1, 1887.
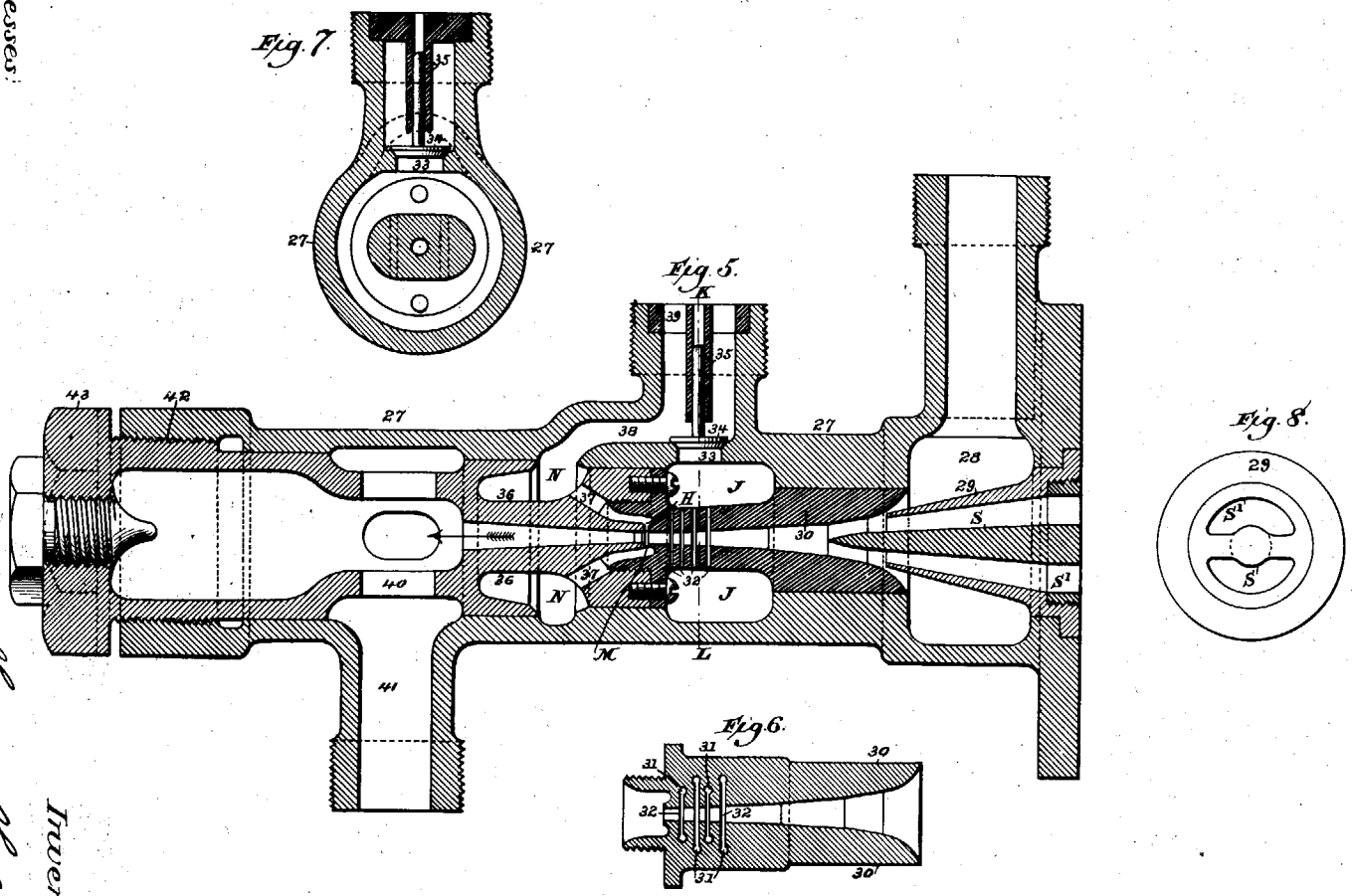
Witnesses:
Geo. H. Bott.
Emil Herter.
Inventors:
Harry Holden
Robt. Grundy Brooke
Thos. Henry White
by their Attys
Brown & Hall

UNITED STATES PATENT OFFICE.

HARRY HOLDEN, ROBERT GRUNDY BROOKE, AND THOMAS HENRY WHITE, OF SALFORD, COUNTY OF LANCASTER, ENGLAND.

INJECTOR.

SPECIFICATION forming part of Reissued Letters Patent No. 10,811, dated March 1, 1887.

Original No. 344,480, dated June 29, 1886. Application for reissue filed February 5, 1887. Serial No. 226,715. Patented in England September 17, 1883, No. 4,430, and February 5, 1884, No. 2,756; in France January 29, 1884, No. 148,123, and in Germany February 29, 1884, No. 2,569.

*To all whom it may concern:*

Be it known that we, HARRY HOLDEN, of Salford, in the county of Lancaster, England, engineer; ROBERT GRUNDY BROOKE, of Salford, aforesaid, engineer, and THOMAS HENRY WHITE, also of Salford, aforesaid, engineer, have invented certain new and useful Improvements in Injectors for Raising and Forcing Liquids, of which the following is a specification, reference being had to the accompanying drawings.

Our invention relates to an improvement in injectors for raising and forcing liquid. In injectors such as are ordinarily employed there is, in addition to the steam nozzle or jet, a tube or throat, into which the steam-nozzle projects, and through which steam issuing from the nozzle induces a current of liquid. This tube or throat is usually termed the "lifting-tube." In line with this lifting-tube is another tube or throat wherein steam is condensed with the flow of water induced by it, and this latter tube we term the "combining-tube."

In injectors there is commonly provided an overflow-opening in the combining-tube, which is in communication through a chamber or passage with the atmosphere.

The object of our invention is to provide greater facility for starting and restarting the injector, and to this end we provide in the combining-tube, or at the entrance to the combining tube and between it and the end of the lifting-tube, a supplemental overflow-opening, which communicates with the main ordinary overflow chamber or passage, and we also provide an automatically closing valve whereby the supplemental overflow-opening will be cut off from communication with the main overflow chamber or passage during the proper working of the injector, and which will be automatically opened to place the supplemental overflow-opening in communication with the main overflow chamber or passage in starting and restarting the injector.

The invention will be hereinafter described in detail, and pointed out in the claims.

In the accompanying drawings, Figure 1 is a longitudinal section of an injector embodying our invention. Figs. 2 and 3 are similar sectional views of injectors embodying our invention in a slightly-modified form as compared with Fig. 1. Fig. 4 is a longitudinal section of as much of an injector as is necessary to illustrate our invention as applied to an injector having a long lifting-tube for raising water from a considerable depth. Fig. 5 is a longitudinal section of an injector embodying our invention, and which is to be worked by steam of a low pressure, such as exhaust-steam from an engine. Fig. 6 is an axial section of the combining-tube of the injector shown in Fig. 5 in a plane at right angles to the plane of Fig. 5. Fig. 7 is a transverse section upon the plane of the dotted line K L, Fig. 5; and Fig. 8 is an end view of the steam-nozzle of the injector shown in Fig. 5 and a perforated plug from which projects a conical spindle arranged centrally in said nozzle.

Referring first to the example of our invention shown in Fig. 1, $t$ is the casing of the injector, to one end of which casing $t$ is secured the steam nozzle or jet $u$. Through one side of the casing $t$ is formed the liquid-inlet $v$, which communicates with the supply of liquid by means of a pipe. Formed within the casing $t$ is the lifting-tube $w$, into which the steam-nozzle $u$ projects. Within the casing $t$ is the combining-tube $x$ and delivery-tube $x^*$, formed in one piece, which for convenience of description, we shall call the "combining-tube" $x$. The combining-tube $x$ is supported by the part $t^*$, formed within the casing $t$, and such combining-tube $x$ has formed upon it an enlarged part, $x^{}$, which is supported by a projecting part, $t^{}$, formed within the casing $t$, the part $t^*$ and the part $t^{**}$ serving as guides within which the combining-tube $x$ may be slid longitudinally. To the end $t'$ of the casing $t$ is secured a hollow plug, $y$, to which may be secured a pipe, $z$, leading to the steam-boiler or other vessel to which liquid is to be supplied. Within the casing $t$ is a spiral spring, $l$, one end of which abuts against the part $t^*$, while the other end of such spring $l$ presses against the enlarged part $x^{**}$ of the combining tube $x$. The spring $l$ tends to move the combining-tube $x$ in the direction of the arrow B, the movement of the combining-tube $x$ in such direction being limited by the socket $y$, the end $y^*$ of which acts as an abutment to the combining-tube $x$. Upon steam being allowed to issue from the steam nozzle or jet $u$, a partial vacuum will be formed within the chamber $v'$, and liquid will be drawn into the said chamber and will be carried by the steam issuing from the steam jet or nozzle $u$ through the lifting-tube $w$. The jet of steam and liquid issuing from the lifting-tube $w$ escapes from the chamber 3, surrounding the opposed ends of the lifting-tube $w$ and combining-tube $x$, until such jet of steam and liquid issues from the lifting-tube $w$ with sufficient velocity to cause such jet of steam and liquid to enter the combining-tube $x$, when the steam and liquid will pass along the combining-tube $x$ and through the pipe $z$ to the steam-boiler or other vessel to which liquid is to be supplied. As soon as the steam and liquid passes along the pipe $z$, the pressure of such steam and liquid acting upon the end surface, C, of the combining-tube $x$ will move the said combining-tube in a direction opposite to that of the arrow B, so as to compress the spring $l$. The combining-tube $x$ will then be forced in the direction opposite to that of the arrow B until the end $x'$ of such combining-tube $x$ arrives in contact with the end $w'$ of the lifting-tube $w$, whereupon the lifting and combining tubes $w$ $x$ act as though they were one tube. The combining-tube $x$ is provided with the usual overflow-opening, $x^2$. If, from any cause, the supply of steam or liquid to the injector becomes interrupted and the pressure of the liquid in the pipe $z$ decreases beyond a certain point, the spring $l$ will expand and force the combining-tube $x$ in the direction of the arrow B until such combining-tube $x$ is again placed in the position shown in the drawings; but upon liquid again passing along the combining-tube $x$ and pipe $z$ the pressure of the liquid passing along the pipe $z$ will again move the combining-tube $x$ aforesaid in a direction opposite to that of the arrow B until the end $x'$ of such combining-tube $x$ arrives in contact with the end $w'$ of the lifting-tube $w$, thus causing the injector to be automatic so far as regards restarting.

The movable combining-tube $x$ itself constitutes a valve whereby the space between the lifting and combining tubes is closed.

A further modification of our invention (shown by Fig. 2) consists in an arrangement of injector, in which we provide one or more outlets or openings between the lifting-tube and a combining-tube which is fixed in position, which openings we close by means of valves when liquid is passing through the combining-tube to the steam-boiler or other vessel to which liquid is being supplied. At 4 is the casing of the injector, within which is the steam nozzle or jet 5, the lifting-tube 6, and combining tube 7. The liquid-supply opening is at 8. Secured to the casing 4 and surrounding the opposed ends of the lifting-tube 6 and combining-tube 7 is a collar, 9, through which any desired number of openings, 10, are formed, two only of such openings 10 being shown in the drawings. Each of the openings 10 is provided with a ball-valve, 11. The casing 4 is provided with openings through which the balls 11 are inserted—one ball 11 through each opening—each of such openings being closed by means of a plug, 12. The plugs 12 are each provided with a hollow, 12*, which serves to direct one ball 11 to one of the openings 10, upon which such balls 11 at times rest. When steam is allowed to issue from the nozzle or jet 5, a partial vacuum will be formed within the chamber D, and liquid will be drawn into such chamber D, and will be carried through the lifting tube 6, and for a time the steam and liquid will force the balls 11 away from the openings 10, and will escape by the opening 13, formed through the casing 4. When the steam and liquid issue from the lifting-tube 6 with sufficient velocity to pass along the combining tube 7, a partial vacuum will be formed between the opposed ends of the lifting and combining tubes 6 7, whereupon the balls 11 will be drawn against the openings 10, so as to close them. After the openings 10 are closed by the balls 11 the lifting-tube 6 and combining-tube 7 will act as though they were one tube. If the supply of liquid or steam to the injector be interrupted from any cause, and the liquid ceases to pass along the combining-tube 7, the balls 11 will be forced from the openings 10, when the liquid and steam will again be allowed to escape through such openings 10 until the liquid and steam again pass along the combining-tube 7, when the balls 11 will be again drawn to and close the openings 10, thus isolating the ordinary overflow-openings, 7*, from the supplementary overflow openings 10, and causing the injector to be automatic so far as regards restarting.

A further modification of our invention is illustrated by Fig. 3, in which the steam nozzle or jet is at 14, and the tube, which we call the "lifting-tube," is at 15. At 16 is the combining-tube, and at 17 is the liquid-supply opening. The end 15* of the lifting tube 15 and the end 16* of the combining-tube 16 are surrounded by a chamber, 18, formed within the casing 19 of the injector. The overflow-opening 20, formed in the combining-tube 16, we also inclose within a chamber, 21, formed within the casing 19 of the injector. Through the side of the chamber 18 we form an opening, 22, provided with a valve, 23, by which such opening 22 may at times be closed. The steam and liquid issuing from the lifting-tube 15 escapes by the opening 22 until such steam and liquid issues from the lifting-tube 15 with sufficient velocity to pass through the combining-tube 16 and into the boiler or other vessel to which liquid is to be supplied, when a partial vacuum will be formed within the chamber 18, and the valve 23 will be drawn against and close the opening 22, thereby tightly closing the chamber 18, and preventing air or vapor from passing to the entrance 16* of the the combining-tube 16. This practically closes the space between the tubes 15 and 16 to the entrance of air or vapor. Any air or vapor carried by the liquid passing along the combining-tube 16 will escape therefrom by the opening 20 into the chamber 21; but when the injector is at work the valve 23 will close the opening 22, as above described, and prevent all communication between the chamber 21 and the chamber 18. If the supply of steam or liquid be interrupted from any cause, no vacuum will be produced within the chamber 18, and the valve 23 will cease to close the opening 22; but upon the steam and liquid passing along the combining-tube 16 and into the boiler or other vessel to be supplied with liquid the valve 23 will again close the opening 22. In cases where a more perfect vacuum is required in injectors to enable them to raise liquid from an increased depth, the length of tubes, which we for convenience call the "lifting-tubes," of such injectors requires to be proportioned to the depth from which the liquid is to be raised, an increased amount of lift requiring the lifting-tube to be of increased length. If the length of the lifting-tube aforesaid be increased beyond a certain limit, such increased length of the lifting-tube interferes with the action of the injector; and the next modification of our invention consists in an arrangement by which we are enabled to employ a long lifting-tube to enable the injector to raise liquid from a considerable depth, and after such liquid has been raised to reduce the distance between the end of the steam nozzle or jet and the entrance to the combining-nozzle.

Fig. 4 shows so much of an injector as is required to illustrate this modification of our invention. At 24 is the steam nozzle or jet. At 25 is the lifting-tube, shown as being of considerable length from E F, and at 26 is the combining tube. Upon the injector being put in action, the combining-tube 26 is withdrawn from the lifting tube 25, so as to leave a space between the end 25* of the lifting-tube 25 and the entrance 26* of the combining-tube 26, so as to allow the steam and liquid a free exit, and thus cause a vacuum in the liquid-chamber G, by which vacuum the liquid is raised to the injector. When the liquid arises within the chamber G, it will be carried by the steam issuing from the steam nozzle 24 through the lifting-tube 25 until the steam and liquid attains a sufficient velocity to cause such steam and liquid to pass through the combining-tube 26 and into the boiler or other vessel to which liquid is to be supplied, when such combining-tube 26 is slid within the lifting-tube 25. The combining-tube 26 may be caused to slide automatically by means of the pressure of the liquid in a manner similar to that described and shown in reference to Fig. 1.

We would have it understood, in reference to all modifications of our invention hereinbefore described and shown, that the axes of the steam nozzle or jet, lifting-tube, and combining-tube must always be in one and the same straight line when the injectors are arranged for use. By the above-described arrangements we prevent the vacuum formed by the jet of steam between the exit end of the lifting-tube and the entrance to the combining-tube from drawing in any air or vapor, which such vacuum would otherwise do if a space or opening or openings were left between the opposed ends of the lifting and combining tubes. Such drawing in of air or vapor would interfere with the perfect action of the injector.

We have hereinbefore referred to the lifting and combining tubes of the injector as at times performing separate functions; but when such injector is supplying liquid to a steam-boiler or other vessel the lifting and combining tubes operate as a combining-tube only.

A further part of our invention relates to that class of injectors in which steam of a low pressure—such as the exhaust-steam from steam-engines—is employed, and is illustrated by Fig. 5 of the accompanying drawings. At 27 is the casing of the injector, and at 28 is a chamber surrounding the nozzle or jet 29, by which steam is supplied to the injector. At 30 is the combining-tube, terminating at H. A portion of the combining-tube 30 we inclose within a chamber, J. Through the sides of the combining-tube 30 we form openings 31, such openings being made by making holes through the sides of such combining-tube 30, as shown in the detached views, Figs. 6 and 7, Fig. 6 of which is a section taken along the axis of the combining-tube 30, at right angles to Fig. 5, and Fig. 7 a cross section taken on the line K L of Fig. 5, the valve 34 being shown in full lines to avoid confusion. The openings 31 are connected by slots 32, such slots 32 communicating with the interior of the chamber J; but we do not confine ourselves to the use of an opening or openings, 31, of this particular form, as such opening or openings may be formed at any angle to the axis of the said combining-tube 30. Through one side of the chamber J we form an opening, 33, which may at times, as we will hereinafter point out, be closed by a valve, 34, such valve 34 being supported by a guide, 35. At 36 is the delivery-tube of the injector, between the end of which delivery-tube 36 and the combining-tube 30 is a space, M. Such space M communicates, by means of openings 37, with a chamber, N, formed within the casing 27, which chamber N communicates, by means of a passage, 38, with the overflow 39, with which the opening 33 also communicates. The delivery-tube 36 communicates, by means of the opening 40 and pipe 41, with the steam-boiler or other vessel to which water or other liquid is to be supplied.

The action of the parts is as follows: Water or other liquid is supplied to the chamber 28, such chamber 28 being situated below the level of the water or other liquid supply. The said water or other liquid will flow along the combining-tube 30, through the openings 31 32 and the space M, between the end H of the combining-tube 30 and the delivery-tube 36, into the overflow-pipe 39. Upon steam being allowed to issue from the nozzle 29, it will be condensed by the water or other liquid flowing along the combining-tube 30. Such condensed steam, along with the water, will escape by the openings 31 32 and the space M until, from the condensation of the steam, the water or other liquid will be caused to flow along the combining-tube 30 in the direction of the arrow *o* with sufficient velocity, when it will pass along the delivery-tube 36 and into the steam-boiler or other vessel to which water or other liquid is to be supplied. As soon as the water or other liquid passes along the delivery-tube 36 a partial vacuum will be formed within the chamber J, and the valve 34 will be drawn so as to close the opening 33 and thereby separate the chamber J and openings 31 32 from communication with the opening or space M and the external air. The space M between the opposed ends of the combining and lifting tubes acts as the ordinary overflow-opening. If from any cause the water or steam supply becomes interrupted, there will cease to be a vacuum within the chamber J. Thereupon the valve 34 will cease to close the opening 33; but upon the water and condensed steam again passing along the delivery-tube 36 a partial vacuum will be again formed within the chamber J, and the valve 34 will again close the opening 33. By the above arrangement we render the injector automatic so far as regards restarting.

The combining-tube 30 and delivery-tube 36 may be adjusted, when required, relatively to the steam nozzle or jet 29, by means of the screwed part 42, formed upon and in the delivery-tube 36 and casing 27, respectively, and the nut 43.

An injector which is operated by exhaust-steam or steam of low pressure depends for its efficiency upon the rapidity with which the steam issuing from the steam-nozzle is condensed. In order to insure a rapid condensation of the jet of steam issuing from the steam-nozzle, it is necessary that the jet of steam present as large a surface as possible to the water. In the injector shown in Figs. 5, 6, 7, and 8 this result is accomplished by the employment of the fixed central conical spindle S in the steam-inlet to the injector, as is shown in Fig. 5. This conical spindle or center projects inward from a plug, S′, which is screwed into the steam-inlet opening in the casing and is provided with passages through it for steam, as shown in Figs. 5 and 8. The issuing steam passes around and along the surface of the central spindle, S, and the portion of the spindle which projects beyond the end of the steam-nozzle 29 serves as a guide to centralize the jet as it contracts upon condensation. If a solid jet of steam were employed and the spindle S were dispensed with, such solid jet would necessarily be of smaller diameter and would therefore expose less surface of steam to the water.

In all examples of our invention it will be observed that the main ordinary overflow-opening is in constant communication with the external air through a chamber or passage, and it will also be observed that in all the examples of our invention the supplemental overflow-opening communicates with said overflow chamber or passage by means of an automatically-closing valve, which, when the injector is working properly, remains closed to prevent the entrance of external air or vapor at the supplemental overflow-opening, and which will automatically open to facilitate the starting or restarting of the injector.

What we claim as our invention, and desire to secure by Letters Patent, is—

1. In an injector having in addition to the main or ordinary overflow opening a supplemental overflow-opening employed to assist in starting and restarting the injector, the combination of a single chamber or passage, which is in communication with the atmosphere, with which the ordinary overflow is in constant communication, and with which the supplemental overflow also communicates, and a valve automatically controlling the communication between the supplemental overflow-opening and said chamber or passage, and serving, when the injector is at work, to automatically cut off the supplemental overflow-opening from communication with said chamber or passage, substantially as herein described.

2. In an injector to be worked by steam of low pressure, the combination of the steam-nozzle 29, the combining-tube 30, having at its end the ordinary overflow-opening, M, and also having a supplemental overflow-opening, 31 32, the chamber J, surrounding said combining-tube, and having an opening, 33, forming a valve-seat, the passage or chamber 38, from which leads the outlet 39 to the air, and with which both the ordinary overflow, M, and the opening 33 communicate, and the automatically-closing valve 34, serving to close the opening 33 and prevent the inflow of air or vapor during the working of the injector, substantially as herein described.

3. In an injector to be worked by steam of low pressure, the combination of the steam-nozzle 29, the conical spindle or center S, centrally fixed within the steam-nozzle, the combining-tube 30, having at its end the ordinary overflow-opening, M, and also having a supplemental overflow-opening, 31 32, the chamber J, surrounding said combining tube, and having an opening, 33, through which it communicates with the external air, and the automatically-closing valve 34, serving to close the opening 33 and to prevent the inflow of air or vapor during the working of the injector, substantially as herein described.

HARRY HOLDEN.
ROBERT GRUNDY BROOKE.
THOMAS HENRY WHITE.

Witnesses:
ALBERT E. HALL,
9 *Mount Street, Manchester, England.*
W. T. CHEETHAM,
18 *St. Ann's Street, Manchester.*